(12) United States Patent
Tsukamoto

(10) Patent No.: US 11,697,471 B2
(45) Date of Patent: Jul. 11, 2023

(54) RETROFIT ELECTRIC MACHINE FOR BICYCLE AND BICYCLE

(71) Applicant: HONDA MOTOR CO., LTD., Tokyo (JP)

(72) Inventor: Kenji Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 17/054,710

(22) PCT Filed: Mar. 27, 2019

(86) PCT No.: PCT/JP2019/013246
§ 371 (c)(1),
(2) Date: Nov. 11, 2020

(87) PCT Pub. No.: WO2019/220784
PCT Pub. Date: Nov. 21, 2019

(65) Prior Publication Data
US 2021/0061410 A1 Mar. 4, 2021

(30) Foreign Application Priority Data
May 16, 2018 (JP) ................................. 2018-094502

(51) Int. Cl.
*B62M 6/55* (2010.01)
*B62M 11/00* (2006.01)

(52) U.S. Cl.
CPC .............. *B62M 6/55* (2013.01); *B62M 11/00* (2013.01)

(58) Field of Classification Search
CPC .......... B62M 6/55; B62M 11/00; B62M 1/36; B62M 3/003; B62M 23/02
(Continued)

(56) References Cited

U.S. PATENT DOCUMENTS 11,390,358 B2 * 7/2022 Tsukamoto .............. B62M 3/00
2010/0263468 A1 10/2010 Fisher et al.
(Continued)

FOREIGN PATENT DOCUMENTS

| JP | 2002264881 A | 9/2002 |
| JP | 2007091159 A | 4/2007 |
| JP | 2009248668 A | 10/2009 |

OTHER PUBLICATIONS

Bimoz User Manual Indiegogo edition, Version 1.0, Z Institute AG, 2016, pp. 5-13.
(Continued)

*Primary Examiner* — Anne Marie M Boehler
(74) *Attorney, Agent, or Firm* — Armstrong Teasdale LLP

(57) ABSTRACT

To allow a wide range of existing bicycles to be easily converted into electric power assisted bicycles, a retrofit electric machine for a bicycle includes: a housing (52) configured to be attached to a frame (18) of a bicycle (10), an electric motor (54) attached to the housing (52); an annular rotating plate (84) mounted on the housing (52) in a rotatable manner and connected to the electric motor (54) in a torque transmitting relationship; a pair of rotatable claw members (96) mounted on the rotating member (84) and having parts configured to abut against either rotational side of a crankarm (26) for a pedal of the bicycle (10); and a connecting member (40, 92) configured to connect the rotatable claw members (96) with a rotationally central part of the crankarm (26) such that the rotating plate (84) is concentric to a rotational center line of the crankarm (26).

8 Claims, 8 Drawing Sheets

(58) Field of Classification Search
USPC .................................................. 180/206.4
See application file for complete search history.

(56) References Cited

U.S. PATENT DOCUMENTS

| | | |
|---|---|---|
| 2017/0320538 A1 | 11/2017 | Sprote et al. |
| 2018/0354580 A1* | 12/2018 | Hara .................. F16C 29/0688 |
| 2021/0052941 A1* | 2/2021 | Tsukamoto .............. B62J 50/22 |
| 2021/0214042 A1* | 7/2021 | Tsukamoto .............. B62M 6/55 |
| 2022/0097798 A1* | 3/2022 | Tsukamoto .............. B62M 6/50 |
| 2022/0212750 A1* | 7/2022 | Tsukamoto .............. B62M 6/50 |
| 2022/0212751 A1* | 7/2022 | Tsukamoto ............ B62J 45/411 |

OTHER PUBLICATIONS

International Search Report for PCT Application PCT/JP2019/013246 dated Jul. 2, 2019; 3 pp.

* cited by examiner

RETROFIT ELECTRIC MACHINE FOR BICYCLE AND BICYCLE

CROSS-REFERENCE TO RELATED APPLICATIONS

This application is a U.S. National Phase Application of PCT/JP2019/013246, filed on Mar. 27, 2019. PCT/JP2019/013246 claims the benefit of Japanese Patent Application No. 2018-094502, filed on May 16, 2018. These applications are hereby expressly incorporated by reference in their entirety.

TECHNICAL FIELD

The present invention relates to a retrofit electric machine for a bicycle and a bicycle, and more particularly to a retrofit electric machine for an electric power assisted bicycle, and a bicycle fitted with the retrofit electric machine.

BACKGROUND ART

Known electric power assist devices for bicycles that can be retrofitted to existing bicycles include the one in which an assist gear rotatively driven by an electric motor for providing an assist force is attached coaxially to a side of a sprocket mounted to a center shaft of a pedal crankarm, and the assist gear and the sprocket are connected to each other via a torque transmitting member so that the assist force is applied to the sprocket (see Patent Document 1, for instance), the one in which a main gear rotatively driven by an electric motor for providing an assist force is coaxially disposed relative to the center shaft of a pedal crankarm, and the main gear and the sprocket are connected to each other via a torque transmitting member so that the assist force is applied to the sprocket (see Patent Document 2, for instance), and the one in which a sprocket rotatively driven by an electric motor for providing an assist force is connected coaxially to a pedal crankarm (see Patent Document 3, for instance).

PRIOR ART DOCUMENT(S)

Patent Document(s)

Patent Document 1: JP2007-091159A
Patent Document 2: JP2009-248668A
Patent Document 3: JP2002-264881A

SUMMARY OF THE INVENTION

Task to be Accomplished by the Invention

The conventional electric power assist devices for a bicycle that can be retrofitted require a significant amount of disassembling work for removing the crankarm, the sprocket, and the like, and assembling work for restoring such parts to the original state, at the time of fitting the electric power assist device to the bicycle. Special tools may be required for the disassembling and assembling work, in addition to the regular tools such as wrenches and spanners. Therefore, a typical user in particular a user not accustomed to mechanic's work may experience some difficulty in converting an existing bicycle into an electric power assisted bicycle by using a retrofit electric power assist device for a vehicle. Furthermore, the electric power assist devices may be lacking in versatility so that the devices may not be retrofitted to the existing bicycle depending on the model thereof.

An object of the present invention is to provide a device that allows a typical user to easily convert a wide range of existing bicycles into electric power assisted bicycles.

A retrofit electric machine for a bicycle according to one embodiment of the present invention comprises: a housing (52) configured to be attached to a frame (18) of a bicycle, a rotating electric machine (54) attached to the housing (52); an annular rotating member (84) mounted on the housing (52) in a rotatable manner and connected to the rotating electric machine (54) in a torque transmitting relationship; a torque transmitting member (96 et al.) mounted on the rotating member and including a pair of parts configured to abut against either side of a crankarm (26) for a pedal of the bicycle with respect to a rotational direction thereof; and a connecting member (40, 92) configured to connect the torque transmitting member with a rotationally central part of the crankarm (26) such that the rotating member (84) is concentric to a rotational center line of the crankarm (26).

Thereby, an electric power assist device (50) for a bicycle can be easily retrofitted to a wide range of existing bicycles (10) without modifying the bicycles (10).

In the retrofit electric machine for a bicycle defined above, preferably, the torque transmitting member includes a pair of rotatable claw members (96) rotatably mounted on the rotating member (84) and having free ends configured to abut against either side of the crankarm (26) with respect to the rotational direction, and a binding member (100, 102) for pulling the rotatable claw members (96) toward each other so that the free ends of the rotatable claw members (96) are pressed against respective outer surfaces of the crankarm from either rotational direction, and the connecting member is provided with a connecting plate (92) including two ends (92C) forming connecting portions with respective base ends (96A) of the rotatable claw members (96) and a central portion (92B) forming a connecting portion with the rotationally central part of the crankarm (26).

Thereby, the electric machine (50) can be adapted to a wide range of crankarms (26) having different dimensions and configurations.

In the retrofit electric machine for a bicycle defined above, preferably, the torque transmitting member includes a torque transmitting main body (104) mounted on the rotating member (84) via a bracket (108) so as to be rotatable around an axial line (A) orthogonal to the rotational center line of the crankarm (26) and provided with a pair of opposing portions (104A, 104B) configured to oppose either outer surface of the crankarm (26) with respect to the rotational direction, a clamp member (110) threadably engaged by one of the opposing portions (104A, 104B) and configured to abut against one (26A) of the outer surfaces of the crankarm (26) with respect to the rotational direction, and a tilt adjusting screw member (112) threadably engaged by the torque transmitting main body (104) and having a free end abutting against the rotating member (84), the connecting member being provided with a connecting screw member (116) threadably engaged by the torque transmitting main body (104) and configured to be connected to the rotationally central part of the crankarm (26).

Thereby, the electric machine (50) can be adapted to a wide range of crankarms (26) having different dimensions and configurations, and the rotating member (84) is prevented from rotating at an angle to the crankarm (26) or from having a play in the tilting direction.

In the retrofit electric machine for a bicycle defined above, preferably, the torque transmitting member includes a linear guide member (120) fixed to the rotating member (84) and extending in a tangential direction of the rotating member (84), a torque transmitting main body (122) mounted on the rotating member via the linear guide member (120) so as to be movable in the tangential direction of the rotating member (84), and provided with a pair of opposing portions (122A, 122B) configured to oppose either rotational side of the crankarm (26), the connecting member being provided with a fixing screw (40) configured to secure the torque transmitting main body (122) to the crankarm (26).

Thereby, the electric machine (50) can be adapted to a wide range of crankarms (26) having different dimensions and configurations.

Preferably, this retrofit electric machine for a bicycle further comprises a rubber member (124) to be interposed between the torque transmitting main body (122) and the crankarm (26).

Thereby, the electric machine (50) can be adapted to a wide range of crankarms (26) having different dimensions and configurations.

In the retrofit electric machine for a bicycle defined above, preferably, the torque transmitting member includes a pair of rotatable members (132, 134) mounted so as to be rotatable around the rotational center line of the crankarm (26) and each having a free end (132A, 134A) configured to abut against a corresponding outer surface of the crankarm (26) with respect to the rotational direction, and a torque transmitting bolt (138) securing one of the rotatable members (132) to the rotating member (84), the connecting member including a securing screw (40) provided on the rotationally central part of the crankarm (26) and configured to secure the rotatable members (132, 134) to the crankarm (26) at selected angular positions.

Since the rotatable members (132, 134) can be secured to the crankarm (26) at any desired angular positions around the rotational center line of the crankarm (26) while maintaining a concentric relationship between the rotating member (84) and the crankarm (26), the electric machine (50) can be adapted to a wide range of crankarms (26) having different dimensions and configurations.

In the retrofit electric machine for a bicycle defined above, preferably, the torque transmitting member further includes an arcuate guide member (136) secured to the rotating member (84) so as to extend circumferentially around the rotational center line of the rotating member (84) and slidably engage the free ends (132A, 134A) of the rotatable members (132, 134).

Thereby, the angular positions of the rotatable members (132, 134) can be stabilized, and the relative rotational movement between the rotating member (84) and the crankarm (26) during use can be prevented in an even more reliable manner.

In the retrofit electric machine for a bicycle defined above, preferably, the housing (52) includes an annular part (52C) concentrically supporting the rotating member (84), and the annular part (52C) and the rotating member (84) are configured to be positioned between the frame (18) and the crankarm (26).

Thereby, the annular part (52C) and the rotating member (84) can be positioned between the frame (18) and the crankarm (26) by passing the crankarm (26) therethrough without requiring to remove the crankarm (26) so that the retrofitting the electric power assist device (50) for a bicycle to a bicycle (10) is facilitated.

This retrofit electric machine for a bicycle preferably further comprises a transmission gear train (60, 66, 68, 80) provided inside the housing (52) between the rotating electric machine (54) and the rotating member (84) such that the rotating electric machine (54) is offset radially outward relative to the rotating member (84) owing to positioning of the transmission gear train (60, 66, 68, 80).

Thereby, the electric motor (54) does not obstruct the positioning of the rotating member (84) relative to the crankarm (26).

In the retrofit electric machine for a bicycle defined above, preferably, the rotating electric machine (54) consists of an electric motor for generating an assist force, and the retrofit electric machine further comprises a battery (152) configured to be mounted on the frame (18) and to serve as a power source for the electric motor.

Thus, an electric power assisted bicycle can be obtained.

Another embodiment of the present invention provides a bicycle fitted with the retrofit electric machine (50) for a bicycle defined above.

By retrofitting the retrofit electric machine (50) for a bicycle to an existing bicycle, the bicycle can be converted into an electric power assisted bicycle or the like without modifying the bicycle (10).

Effect of the Invention

The electric power assist device for a bicycle according to the present invention thus allows a wide range of existing bicycles to be easily converted into electric power assisted bicycles.

BRIEF DESCRIPTION OF THE DRAWING(S)

DESCRIPTION OF THE PREFERRED EMBODIMENT(S)

A retrofit electric device for a bicycle according to a first embodiment of the present invention as applied to an electric power assist device for a bicycle is described in the following with reference to FIGS. 1 to 4.

Figure 1:
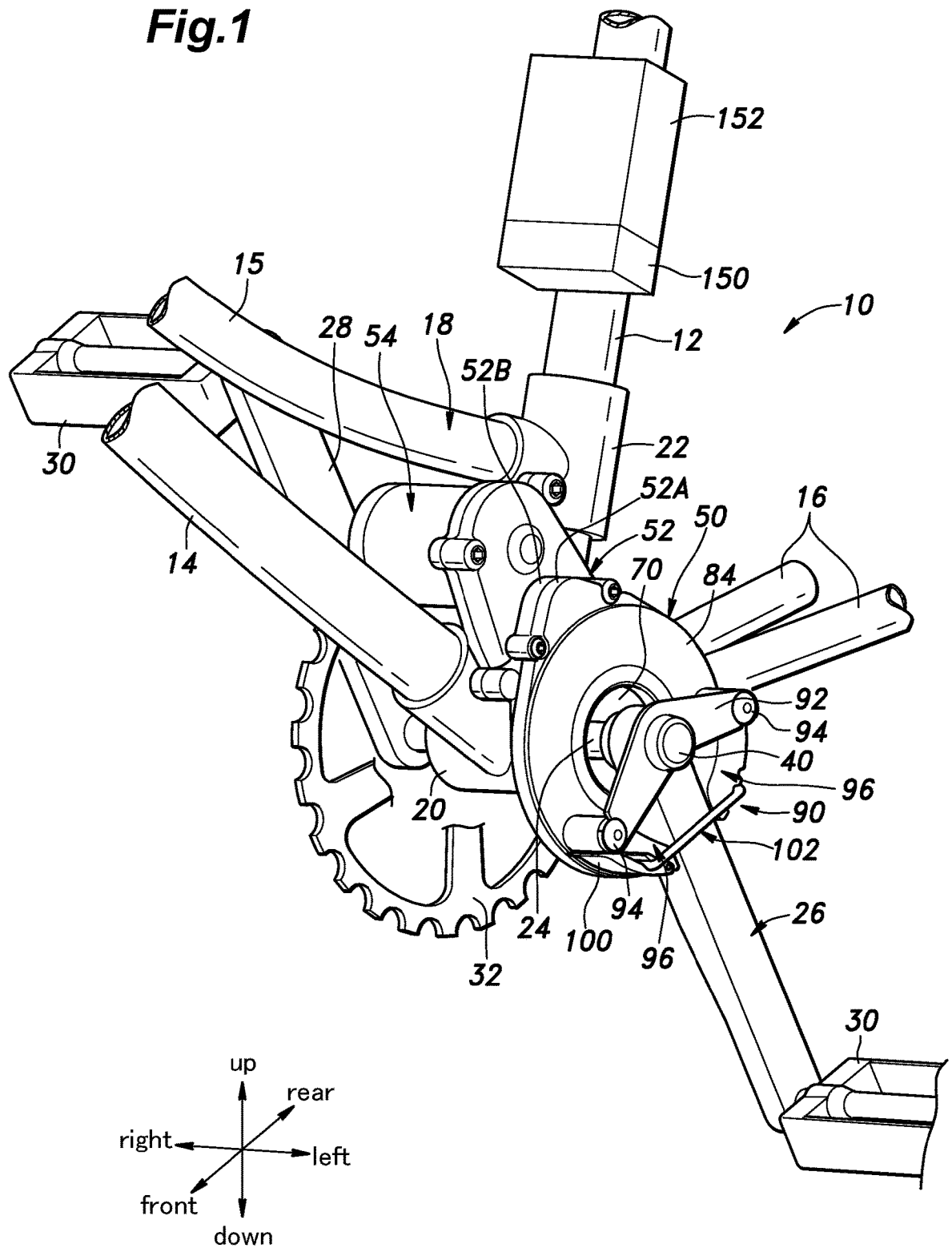
FIG. 1 is a perspective view of a principal part of a bicycle to which a retrofit electric machine for a bicycle (an electric power assist device for a bicycle) according to a first embodiment of the present invention is mounted.

As shown in FIG. 1, a bicycle 10 is provided with a structural frame 18 that includes a seat tube 12 extending in a substantially vertical direction, a down tube 14 extending in a substantially fore and aft direction, an auxiliary tube 15 and a pair of chain stays 16 provided on either side thereof. The lower end of the seat tube 12, the rear end of the down tube 14, and the front ends of the chain stays 16 are joined to one another by a tubular bearing housing 20 that also serves as a pipe joint. The rear end of the auxiliary tube 15 is connected to a lower end part of the seat tube 12 via a pipe joint 22.

The tubular bearing housing 20 rotatably supports a crankshaft 24 that extends substantially horizontally in the lateral direction via a bearing (not shown in the drawings). The left and right end portions of the crankshafts 24 protrude outwardly from the tubular bearing housing 20 to the left and right, respectively, and the base ends of the left and right crankarms 26 and 28 each having a substantially rectangular cross section are fixedly attached to the respective end portions of the crankshafts 24 that protrude in the lateral direction with a rotational phase difference of 180 degrees. The crankshaft 24 forms the rotational center of the crankarms 26 and 28, and the rotational center line of the crankshaft 24 and the rotational center line of the crankarms 26 and 28 are on the same axial line.

Figure 2:
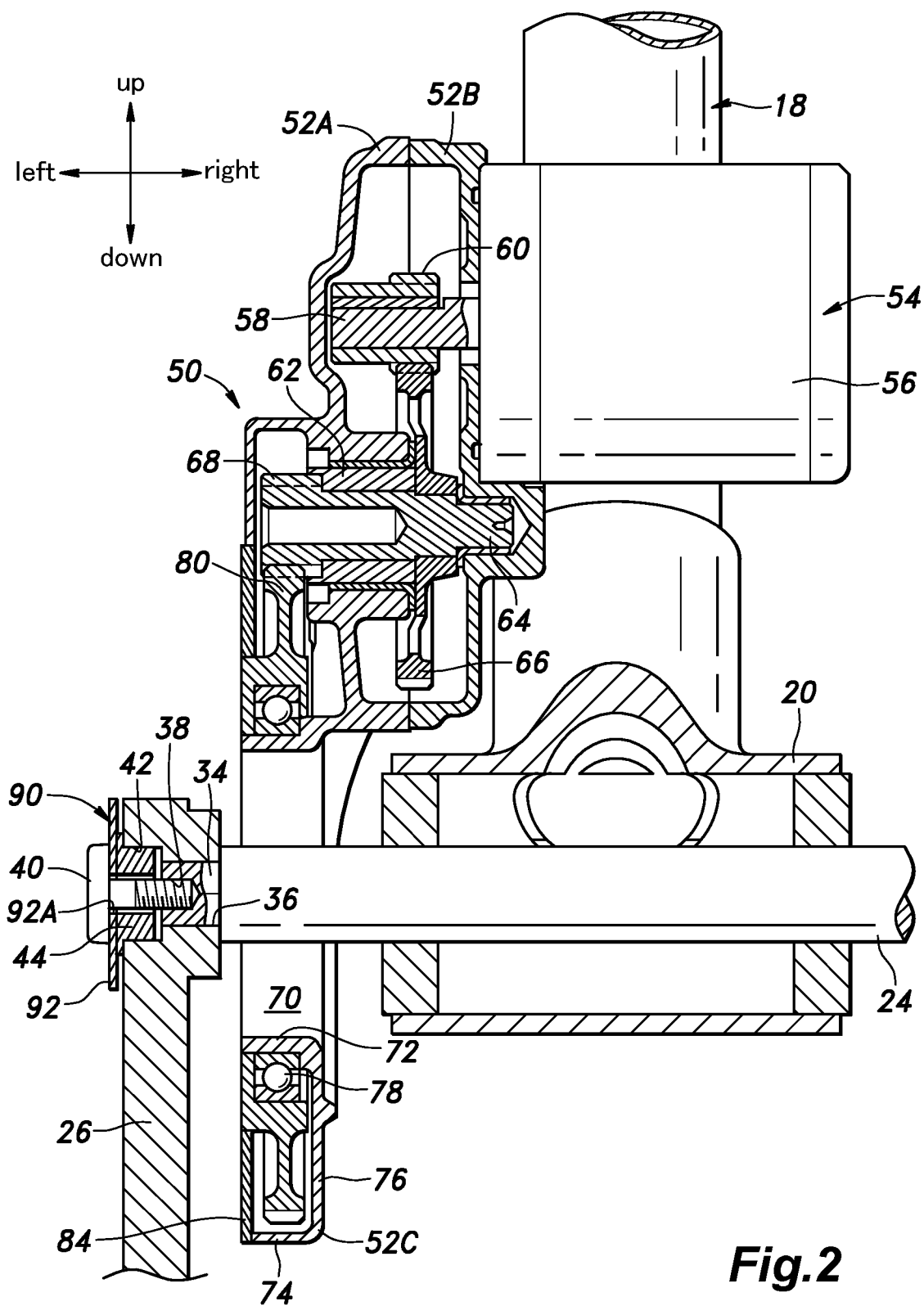
FIG. 2 is a vertical sectional view of the retrofit electric machine for a bicycle of the first embodiment.

As shown in FIG. 2, the crankshaft 24 and the crankarm 26 are connected to each other with a shape fit between a rectangular rod portion 34 formed in the corresponding protruding end of the crankshaft 24 and a rectangular hole 36 formed in the base end of the crankarm 26 so that the crankshaft 24 and the crankarm 26 are connected to each other in a torque transmitting relationship or in a rotationally fast manner. The end surface of the rectangular rod portion 34 of the crankshaft 24 is formed with a screw hole 38. The base end of the crankarm 26 is formed with a circular hole 42 that is connected to the rectangular hole 36 from the left (outboard side), and a flanged collar member 44 is fitted into the circular hole 42.

A crankarm fixing screw 40 is passed through a through hole 92A consisting of a circular hole formed in a central part of a connecting plate 92 which will be described hereinafter and the collar member 44, and is threaded into the screw hole 38. By this screw thread engagement, the crankshaft 24 is fixedly secured to the crankarm 26, 28 against axial movement, and additionally the connecting plate 92 is fixedly attached to the crankshaft 24 and the crankarm 26.

A pedal 30 is attached to the free end of each crankarm 26, 28 (see FIG. 1). A drive sprocket 32 is positioned between the right crankarm 28 and the tubular bearing housing 20. The drive sprocket 32 is connected to the crankshaft 24.

The crankshaft 24 is rotationally driven by the crankarms 26 and 28. The rotation of the crankshaft 24 (rotation in the forward travel direction) is transmitted to the drive sprocket 32, and is transmitted from the drive sprocket 32 to a rear wheel (not shown in the drawings) via a chain transmission mechanism (not shown in the drawings). Thereby, the bicycle 10 is caused to travel forward by the rotation of the crankshaft 24.

So far, the structure is similar to that of a common existing bicycle 10.

As shown in FIG. 1, a retrofit electric device 50 for a bicycle (hereinafter, referred to as an electric power assist device 50) of the present embodiment is mounted to a part of the bicycle 10 so as to adjoin an outer side of the tubular bearing housing 20. In the following description, the up, down, front, back, left and right directions are directions with respect to the condition in which the electric power assist device 50 is mounted to the frame 18 of the bicycle 10 as shown in FIG. 1.

As shown in FIGS. 1 and 2, the electric power assist device 50 includes a housing 52 defining a hollow interior, and formed by a first half 52A on the left and a second half 52B on the right.

An electric motor 54 is attached to the housing 52. The electric motor 54 has a cylindrical outer casing 56 including a base end fixed to the outer surface of the second half 52B. The outer casing 56 protrudes rightward or outward from the second half 52B.

As shown in FIG. 2, the electric motor 54 has an output shaft 58 that projects leftward from the second half 52B into the housing 5. The output shaft 58 fixedly supports a small-diameter drive spur gear 60. The first half 52A rotatably supports an intermediate shaft 64 via a bush 62 or the like therein. The intermediate shaft 64 fixedly supports a large-diameter intermediate spur gear 66 that meshes with the drive spur gear 60 on the right side of the bush 62. The intermediate shaft 64 has a small-diameter intermediate spur gear 68 integrally formed thereon on the left side of the bush 62.

The first half 52A is integrally provided with an annular portion 52C extending downward from the first half 52A. The annular portion 52C includes a cylindrical portion 72 that defines a central opening 70, a substantially cylindrical outer peripheral portion 74 that is formed concentric with the cylindrical portion 72 radially outward of the cylindrical portion 72, and a right side portion 76 consisting of an annular plate extending between the cylindrical portion 72 and outer peripheral portion 74, and is thus configured to be open on the left side.

An annular large output spur gear 80 is rotatably mounted on the outer peripheral portion of the cylindrical portion 72 via a ball bearing 78. The output spur gear 80 meshes with the intermediate spur gear 68. Thus, a two-stage transmission gear train including the intermediate spur gear 66 and the intermediate spur gear 68 is formed between the drive spur gear 60 and the output spur gear 80.

An annular rotating plate (rotating member) 84 is fixedly secured to the left side of the output spur gear 80 in a concentric relationship. The entire left side surface of the rotating plate 84 is exposed to the left on the left side of the annular portion 52C, and is rotatable jointly with the output spur gear 80 around the central axial line of the cylindrical portion 72 radially outwardly of the central opening 70. The rotating plate 84 is thus rotationally driven by the electric motor 54 via the above-described two-stage transmission gear train.

Since both the output spur gear 80 and the rotating plate 84 have an annular shape concentric with the central opening 70, both axial ends of the central opening 70 are open without being obstructed by the output spur gear 80 or the rotating plate 84, and extends laterally with a constant inner diameter.

In this electric power assist device 50, the housing 52 is fixed to the frame 18 of the bicycle 10 in such a manner that the crankshaft 24 passes through the central opening 70, and the annular portion 52C of the housing 52 and the rotating plate 84 are positioned between the frame 18 and the left crankarm 26, and the rotating plate 84 is positioned in a coaxial relationship to the crankshaft 24 by virtue of a connecting mechanism 90.

Figure 3:
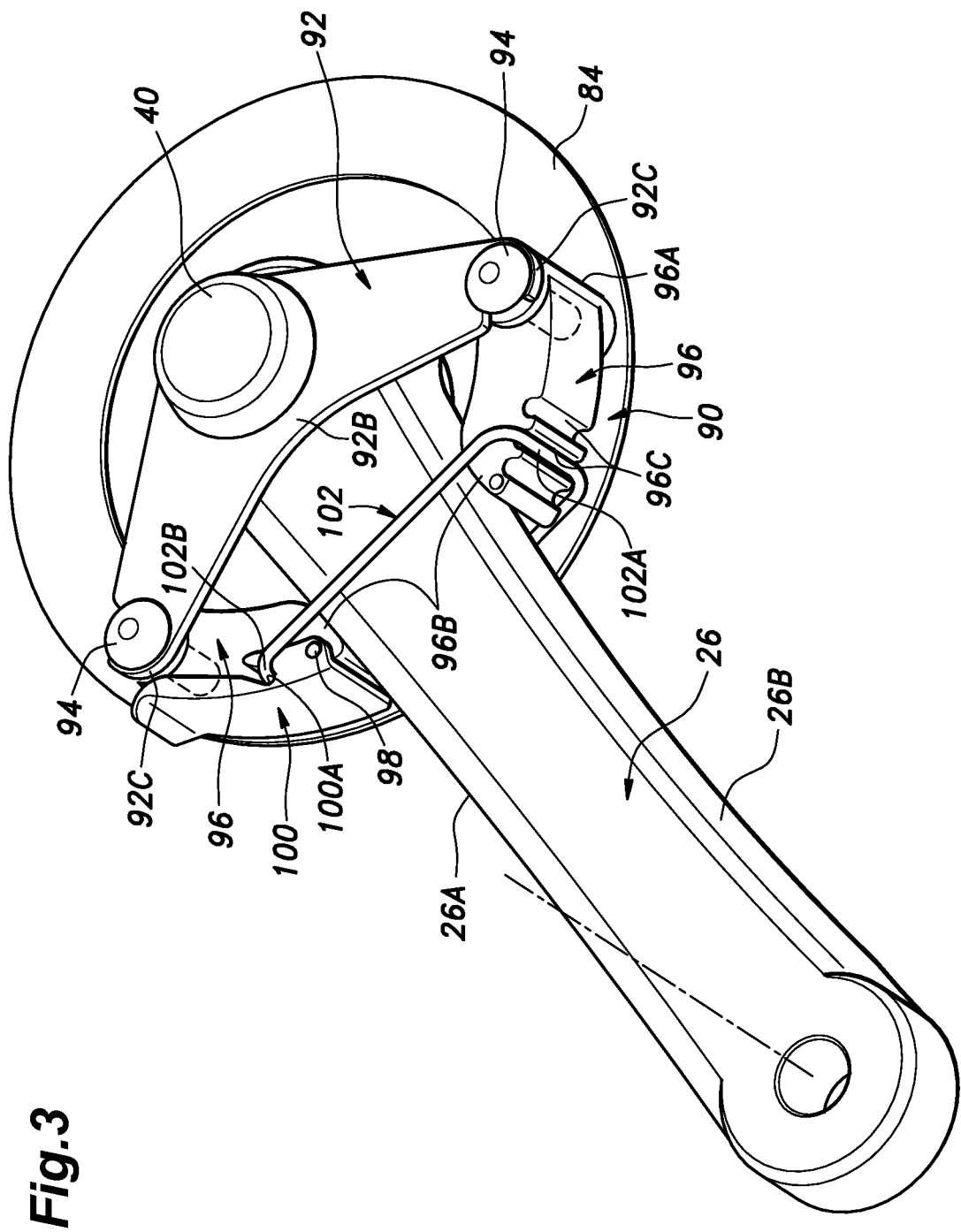
FIG. 3 is a perspective view of the retrofit electric machine for a bicycle of the first embodiment.
Figure 4:
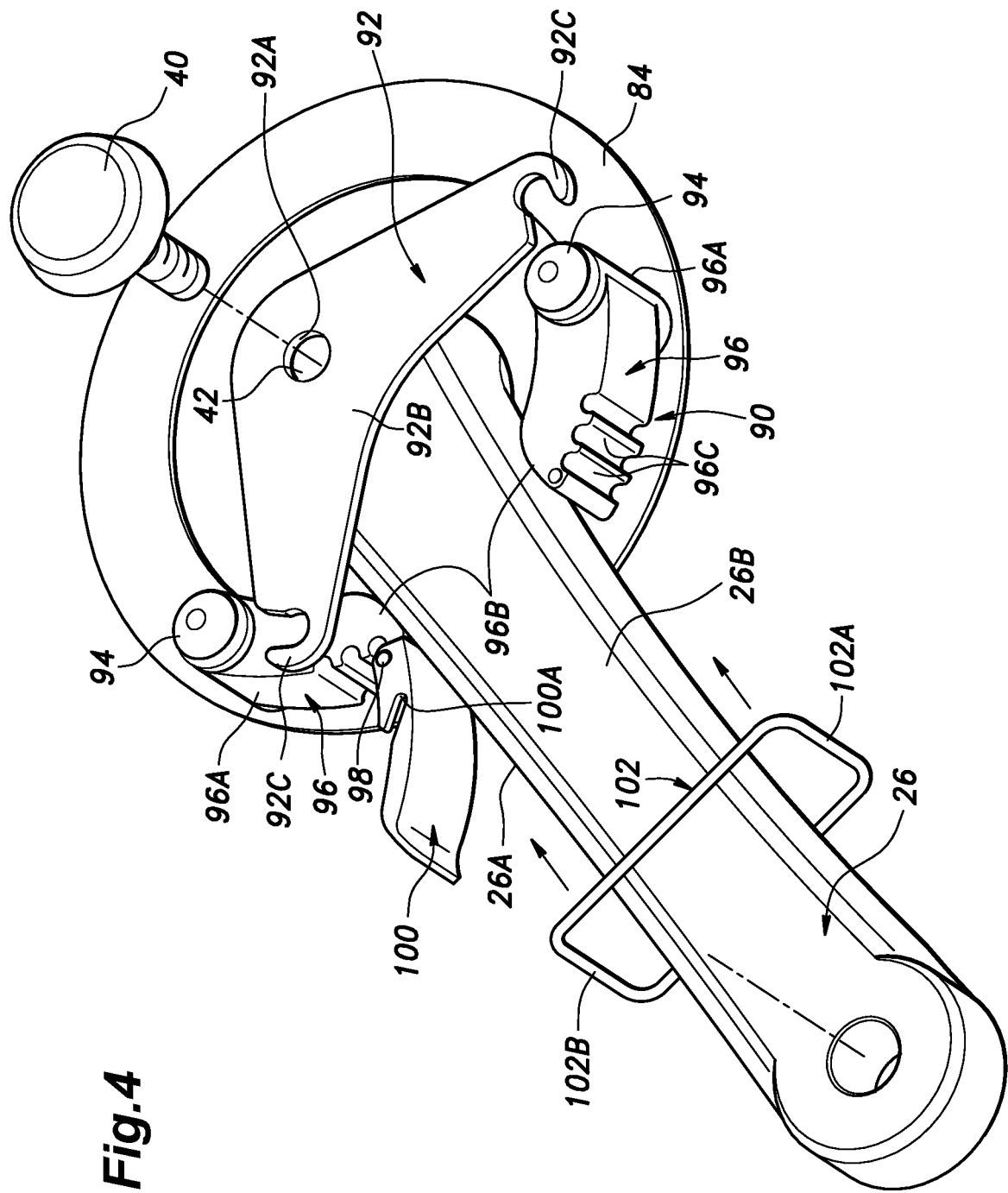
FIG. 4 is an exploded perspective view of the retrofit electric machine for a bicycle of the first embodiment.

As shown in FIGS. 3 and 4, the connecting mechanism (connecting member) 90 includes a pair of connecting pins 94 placed on the plate-shaped connecting plate 92 and the rotating plate 84 in two different locations with respect to the rotational direction thereof. The connecting plate 92 has a central portion 92B formed with a through hole 92A through which the crankarm fixing screw 40 passes, and hook-shaped end portions 92C that engage with the respective connecting pins 94, and is fixed to the rotationally central part of the crankarm 26 at the central portion 92B thereof by using the crankarm fixing screw 40.

Each connecting pin 94 rotatably supports a base portion 96A of a rotatable claw member 96 that forms a torque transmitting member. Each connecting pin 94 additionally serves as a structural support shaft for the corresponding rotatable claw member 96. The rotatable claw members 96 are positioned on either side of the crankarm 26 with respect to the rotational direction thereof, and are each provided with a free end 96B configured to abut against a corresponding outer surface 26A, 26B of the crankarm 26 with respect to the rotational direction thereof.

Thus, the connecting mechanism 90 includes the two end portions 92C each forming a connecting portion with the base portion 96A of the corresponding rotatable claw member 96, and a central portion 92B forming a connecting portion with the rotationally central part of the crankarm 26.

A plurality of engaging grooves 96C are formed in a free end part of one of the rotatable claw members 96 at regular intervals along the lengthwise direction of the rotatable claw member 96. In the present embodiment, the engaging grooves 96C are also formed in the other rotatable claw member 96 in order to make the two rotatable claw members 96 interchangeable with each other. A free end part of the other rotatable claw member 96 rotatably supports a base end of a binding arm 100 via a pivot shaft 98.

An engagement groove 100A is formed in a lengthwise intermediate portion of the binding arm 100. A rectangular binding ring 102 surrounds the crankarm 26, and two sides 102A and 102B of the rectangular binding ring 102 engage a selected one of the engaging grooves 96C of the rotatable claw member 96 and the sole engaging groove 100A of the binding arm 100, respectively. The binding ring 102 is dimensioned such that the crankarm 26 with the pedal 30 removed therefrom can be passed into the binding ring 102 from the free ends side the crankarm 26 to the base end side of the crankarm 26.

As shown in FIG. 3, when the binding arm 100 is rotated toward the rotatable claw member 96, the binding arm 100 pulls the binding ring 102 toward the binding arm 100 with the result that the free ends 96B of the rotatable claw members 96 are pressed against the outer surfaces 26A and 26B of the crankarm 26 from either rotational direction, and are fastened together.

Thereby, the rotating plate 84 is connected to the crankshaft 24 and the crankarm 26 in a torque transmitting relationship so that the assist force generated by the electric motor 54 can be transmitted to the crankarm 26 and the crankshaft 24 via the rotating plate 84, the connecting pins 94 and the rotatable claw members 96.

In the fastened state, the crankarm 26 is clamped between the rotatable claw members 96 from either rotational direction without any play so that the assist force can be transmitted from the rotating plate 84 to the crankarm 26 in a stable and reliable manner during use without causing any relative rotational displacement (rotational play) between the rotating plate 84 and the crankarm 26 and without incurring any torque fluctuations.

In the first embodiment, when the rotatable claw members 96 are rotated, the free ends 96B of the rotatable claw members 96 are caused to move toward each other so that the crankarm 26 is clamped from both sides with respect to the rotational direction. Furthermore, the binding ring 102 is dimensioned so as to surround the crankarm 26 with a certain margin, and is configured to engage a selected one of the engaging grooves 96C of the rotatable claw member 96. Owing to these features, the electric power assist device 50 can be mounted to various bicycles 10 having crankarms 26 which may have widely different shapes and dimensions, and thus has a high versatility.

As shown in FIG. 1, a control unit 150 for electric power assist and a battery 152 serving as a power source for the electric motor 54 and the control unit 150 are attached to the seat tube 12 by using a fastening band (not shown in the drawings) or the like.

The electric power assist device 50 can be attached to the bicycle 10 by a worker according to the following procedure.

First of all, the left pedal 30 on the side not fitted with the drive sprocket 32 is removed by using a common tool such as a spanner. Next, as shown in FIG. 4, with the electric power assist device 50 laid on one side (so that the electric motor 54 faces upward) and the connecting plate 92 and the binding ring 102 removed therefrom, the free end of the left crankarm 26 is passed into the central opening 70 and moved along the length of the crankarm 26 until the electric power assist device 50 reaches the base end (the rotational center) of the crankarm 26. Thus, the crankarm 26 is passed through the rotating plate 84 and the annular portion 52C until the electric power assist device 50 reaches the base end part of the crankarm 26. If the central opening 70 is large enough for the pedal 30 to pass through, the pedal 30 is not required to be removed.

Thereafter, the posture of the electric power assist device 50 is changed in such a manner that the electric motor 54 faces in the lateral direction (the posture shown in FIG. 1), and the crankshaft 24 is passed through the central opening 70 in the axial direction. Thus, the rotating plate 84 and the annular portion 52C can be positioned between the frame 18 and the crankarm 26 simply by removing the pedal 30. At this time, the electric motor 54 is positioned vertically between the auxiliary tube 15 and the down tube 14 on the front side of the lower end part of the seat tube 12 as shown in FIG. 1. The electric power assist device 50 can be fixedly secured to the frame 18 by fixing the outer casing 56 of the housing 52 or the electric motor 54 to the seat tube 12, the down tube 14, or the auxiliary tube 15 by using a fastening band (not shown in the drawings) made of rubber or the like.

Then, the end portions 92C of the connecting plate 92 are engaged with the corresponding connecting pins 94, and with the through hole 92A of the connecting plate 92 and the center of the collar member 44 aligned with each other, the crankarm fixing screw 40 is inserted into the collar member 44 via the through hole 92A, and is threaded into the screw hole 38 with the result that the connecting plate 92 is fixedly secured to the crankshaft 24 and the crankarm 26 by the fastening of the crankarm fixing screw 40.

Then, the binding ring 102 is moved from the free end side of the crankarm 26 to the base end side of the crankarm 26 so that the crankarm 26 is passed through the inside of the binding ring 102, and one side 102A of the binding ring 102 is engaged with a selected one of the engaging grooves 96C of the rotatable claw member 96 while the other side 102B of the binding ring 102 is engaged with the engaging groove 100A of the binding arm 100. The crankarm 26 is then rotated toward one of the rotatable claw members 96. As a result, the binding ring 102 is pulled toward the binding arm 100, and the free ends 96B of the rotatable claw members 96 are pressed against the outer surfaces 26A and 26B of the crankarm 26, respectively, with respect to the rotational direction of the crankarm 26.

Thereafter, the pedal 30 is attached to the crankarm 26, and this concludes the mounting of the electric power assist device 50.

In this mounted state, the rotating plate 84 is exposed to the left between the tubular bearing housing 20 and the crankarm 26, and is connected to the rotational center of the crankarm 26 and the crankshaft 24 in a coaxial manner via the connecting mechanism 90 attached to the exposed surface (left surface) of the rotating plate 84.

As a result, the crankarm 26 and the crankshaft 24 of the existing bicycle 10 are concentrically (coaxially) connected to the rotating plate 84 via the connecting mechanism 90, and the rotation of the rotating plate 84 is transmitted to the crankshaft 24 without any runout.

Since the electric motor 54 is in a position that is offset radially outward with respect to the annular portion 52C and the rotating plate 84 owing to the presence of the above-described transmission gear train, the electric motor 54 is prevented from interfering with the positioning of the annular portion 52C and the rotating plate 84 relative to the crankarm 26.

As described above, a general user can easily retrofit the electric power assist device 50 to any existing bicycle 10 which may vary particularly in the configuration and dimensions of the crankarm 26 without modifying the bicycle 10 and without requiring any special tool so that a wide range of existing bicycles not limited to those having frame structures of any particular configurations can be converted into electric power assisted bicycles without any difficulty.

Figure 5:
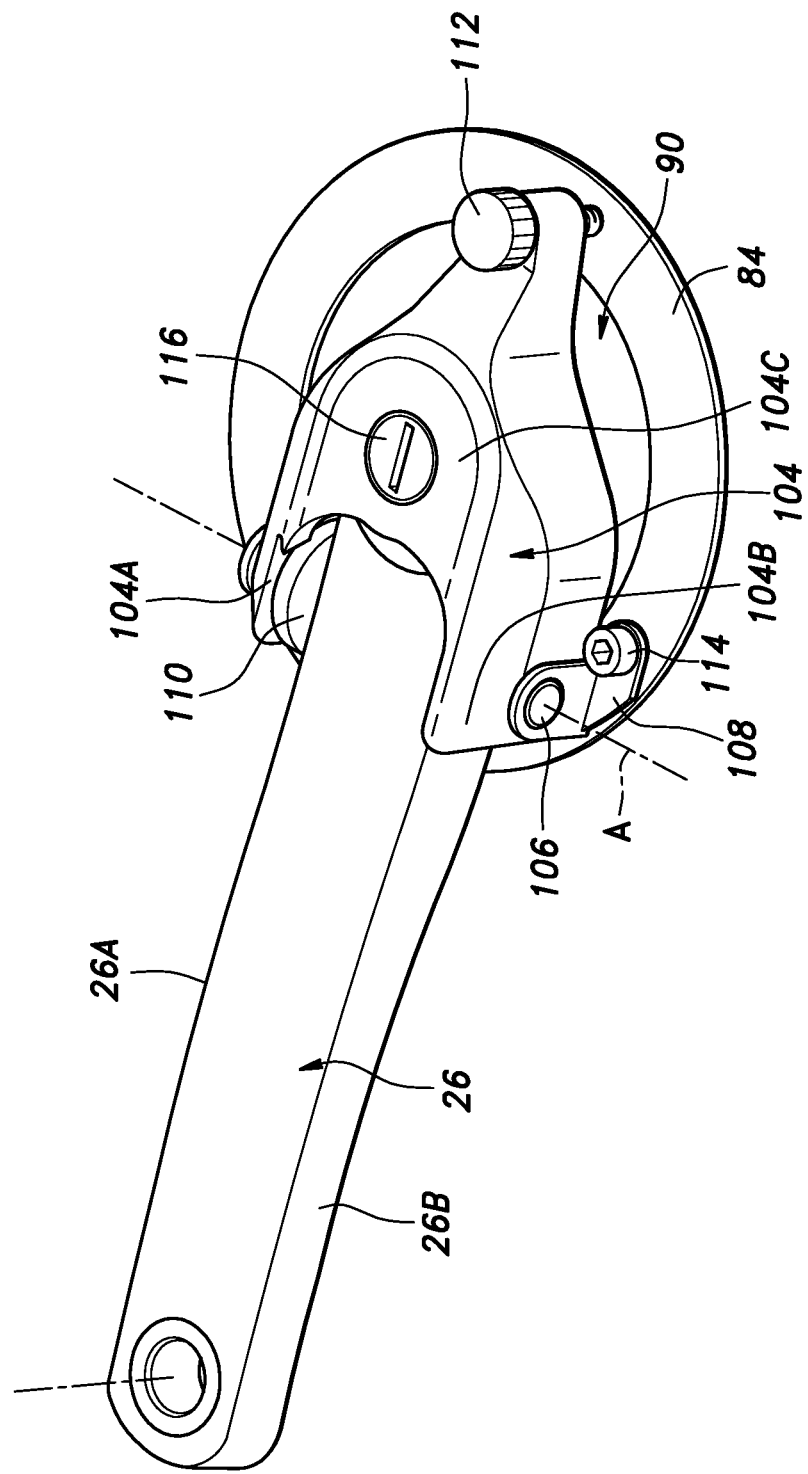
FIG. 5 is a perspective view of an essential part of a retrofit electric machine for a bicycle according to a second embodiment of the present invention.
Figure 6:
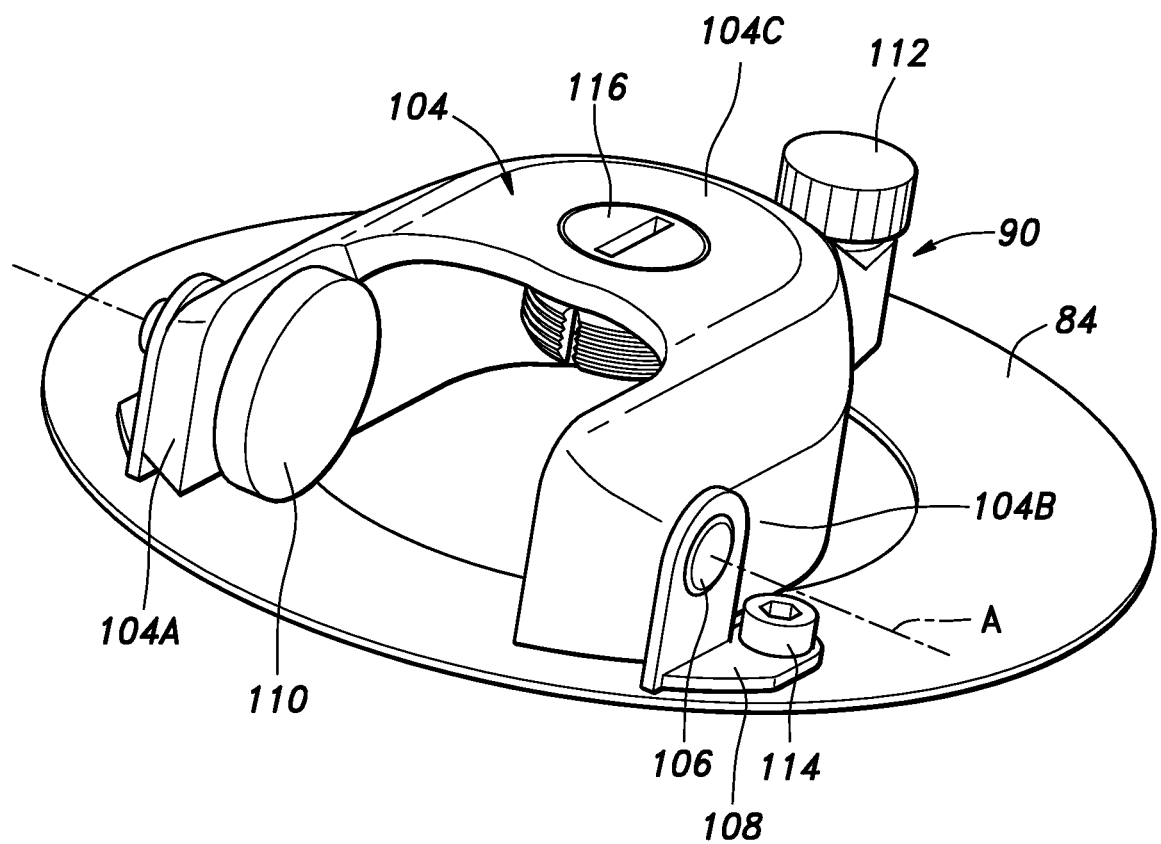
FIG. 6 is a perspective view of a torque transmitting main body of the retrofit electric machine for a bicycle of the second embodiment.

An electric power assisted device for a bicycle according to a second embodiment of the present invention is described in the following with reference to FIGS. 5 and 6. In FIGS. 5 and 6, parts corresponding to those in FIGS. 1 to 4 are denoted with the same reference numerals as those in FIGS. 1 to 4 without repeating the description of such parts.

In the second embodiment, a torque transmitting member includes a saddle-shaped torque transmitting main body 104 provided with a pair of opposing portions 104A and 104B opposing the outer surfaces 26A and 26B of the crankarm 26, respectively, from either rotational direction of the crankarm 26, a pair of brackets 108 mounted on parts of the rotating plate 84 located on the outer sides of the respective opposing portions 104A and 104B each via a pivot shaft 106 so as to be rotatable around an axial line orthogonal to the rotational center line of the crankarm 26, a clamp member 110 threadably engaged with one of the opposing portions 104A so as to abut against the corresponding outer surface 26A of the crankarm 26 by a threading movement in the direction toward the outer surface 26A of the crankarm 26, and a tilt adjusting screw member 112 threadably engaged with a part of the torque transmitting main body 104 radially offset from the pivot shafts 106 and configured to abut against the rotating plate 84 at the free end thereof by a threading movement along the rotational center line of the crankarm 26. Each bracket 108 is fixedly secured to the rotating plate 84 by a mounting screw member 114. Thus, the torque transmitting main body 104 is mounted so as to be rotatable (tiltable) around an axial line A orthogonal to the rotational center line of the crankarm 26.

A connecting screw member 116 serving as a connecting member is threadably engaged with a central part 104C of the torque transmitting main body 104 for connection with the rotationally central part of the crankarm 26.

In the second embodiment, as the clamp member 110 is threadingly advanced, the crankarm 26 is clamped between the clamp member 110 and the opposing portion 104B from either rotational direction owing to the abutting of the free end of the clamp member 110 against one of the outer surfaces 26A of the crankarm 26 from one rotational direction, and the abutting of the opposing portion 104B of the torque transmitting main body 104 against the other outer surface 26B of the crankarm 26 from the other rotational direction.

As a result, the rotating plate 84 and the crankarm 26 are connected in a torque transmitting relationship, and the assist force generated by the electric motor 54 is transmitted from the rotating plate 84 to the crankarm 26 via the mounting screw members 114, the brackets 108, the torque transmitting main body 104, and the clamp member 110. Since the rotating plate 84 is connected to the rotationally central part of the crankarm 26 by the connecting screw member 116, the rotating plate 84 is able to rotate without any runout relative to the rotational center of the crankarm 26.

Since the torque transmitting main body 104 tilts around the axial line A of the pivot shaft 106 by threadingly advancing the tilt adjusting screw member 112, the tilting of the rotating plate 84 relative to the crankarm 26 and the rattling in the tilting direction can be eliminated. As a result, the rotating plate 84 is enabled to rotate relative to the crankarm 26 without tilting or rattling in the tilting direction relative to the crankarm 26.

The electric power assist device 50 can be mounted to the bicycle 10 by positioning the electric power assist device 50 between the frame 18 and the crankarm 26 with the bracket 108 and the torque transmitting main body 104 removed therefrom, and the left pedal 30 removed from the crankarm 26 by using an ordinary tool, such as a spanner, in a similar manner as in the first embodiment.

The torque transmitting main body 104 is then attached to the rotating plate 84 by using the mounting screw member 114, and the crankarm 26 is clamped between the clamp member 110 and the opposing portion 104B from either rotational direction by threadingly advancing the clamp member 110.

Thereafter, the rotating plate 84 is connected to the rotationally central part of the crankshaft 24 by using the connecting screw member 116, and the torque transmitting main body 104 is caused to undergo a tilting movement around the axial line of the pivot shafts 106 by adjusting the threading amount of the tilt adjusting screw member 112 so as to eliminate the tilting of the rotating plate 84 relative to the crankarm 26.

Thereafter, by attaching the pedal 30 to the crankarm 26, the mounting of the electric power assist device 50 is completed.

In the second embodiment, since the distance between the clamp member 110 and the opposing portion 104B can be adjusted by virtue of the clamp member 110, the electric power assist device 50 can be adapted to a wide range of crankarms 26 having different dimensions and configurations.

Figure 7:
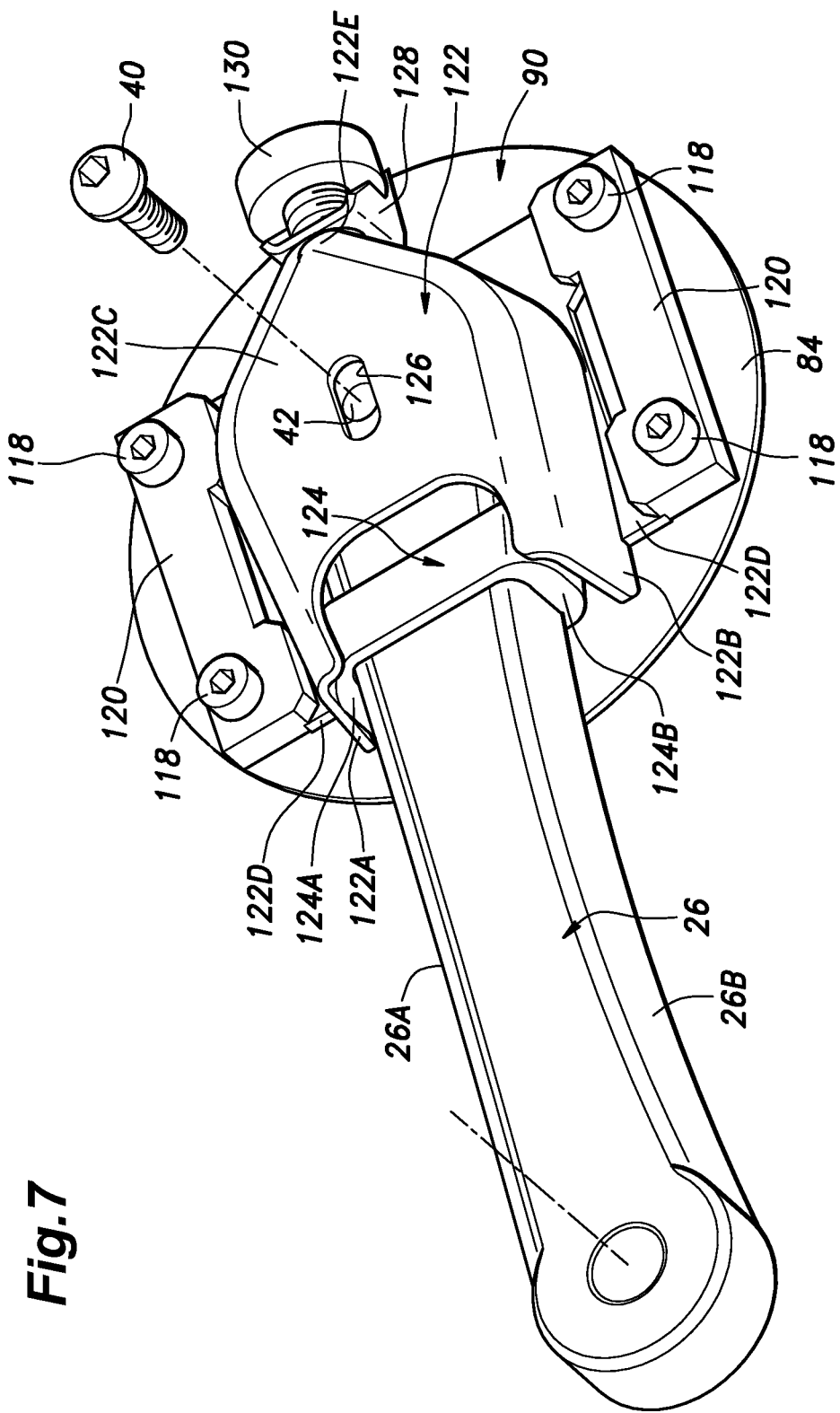
FIG. 7 is a perspective view of an essential part of a retrofit electric machine for a bicycle according to a third embodiment of the present invention.

An electric power assisted device for a bicycle according to a third embodiment of the present invention is described in the following with reference to FIG. 7. In FIG. 7, parts corresponding to those in FIGS. 1 to 4 are denoted with the same reference numerals as those in FIGS. 1 to 4 without repeating the description of such parts.

The third embodiment is provided with a torque transmitting member including a pair of linear guide members 120 attached to the rotating plate 84 with screws 118 and extending in parallel to each other in the tangential direction of the rotating plate 84 or in the lengthwise direction of the crankarm 26, and a torque transmitting main body 122. The torque transmitting main body 122 includes a pair of side guide pieces 122D that slidably engage with the respective linear guide members 120 so that the torque transmitting main body 122 is guided along the tangential direction of the rotating plate 84 by the linear guide members 120. The torque transmitting main body 122 is saddle-shaped, and is provided with a pair of opposing portions 122A and 122B opposing the two sides of the crankarm 26 in either rotational direction.

An annular rubber member 124 is wrapped around the outer periphery of the crankarm 26 in a part thereof opposing the opposing portions 122A and 122B. The rubber member 124 includes two sides 124A and 124B that are elastically clamped between the opposing portions 122A and 122B and the respectively outer surfaces 26A and 26B of the crankarm 26.

A slot 126 elongated in the lengthwise direction of the crankarm 26 is passed through the central portion 122C of the torque transmitting main body 122. The slot 126 is aligned with the circular hole 42 provided in the rotational center of the crankarm 26. A crankarm fixing screw 40 is passed through the slot 126 and the circular hole 42. As in the first embodiment, the crankarm fixing screw 40 is threaded into the screw hole 38 (see FIG. 2) of the crankshaft 24 to fixedly secure the crankarm 26 to the crankshaft 24, and fixedly secure the torque transmitting main body 122 to the crankshaft 24 (see FIG. 2) and the crankarm 26.

A bracket 128 is fixed to the rotating plate 84. The bracket 128 threadably receives a position adjusting screw 130 including a tip which abuts against an end portion 122E of the torque transmitting main body 122 as the position adjusting screw 130 threadingly advance in the radial direction of the torque transmitting main body 122.

In the third embodiment, the assist force is transmitted from the rotating plate 84 to the crankarm 26 via the linear guide members 120, the torque transmitting main body 122, and the rubber member 124.

In the third embodiment, the securing position of the torque transmitting main body 122 relative to the crankarm 26 can be changed in the lengthwise direction of the crankarm 26 while maintaining the concentricity of the rotating plate 84 with the crankarm 26. Thus, the electric power assist device 50 can be adapted to a wide range of crankarms 26 having different lengthwise dimensions and configurations.

Furthermore, the two sides 124A and 124B of the rubber member 124 are elastically clamped between the opposing portions 122A and 112B and the respective outer surfaces 26A and 26B of the crankarm 26 so that the electric power assist device 50 can be adapted to a wide range of crankarms 26 having different dimensions and configurations.

Figure 8:
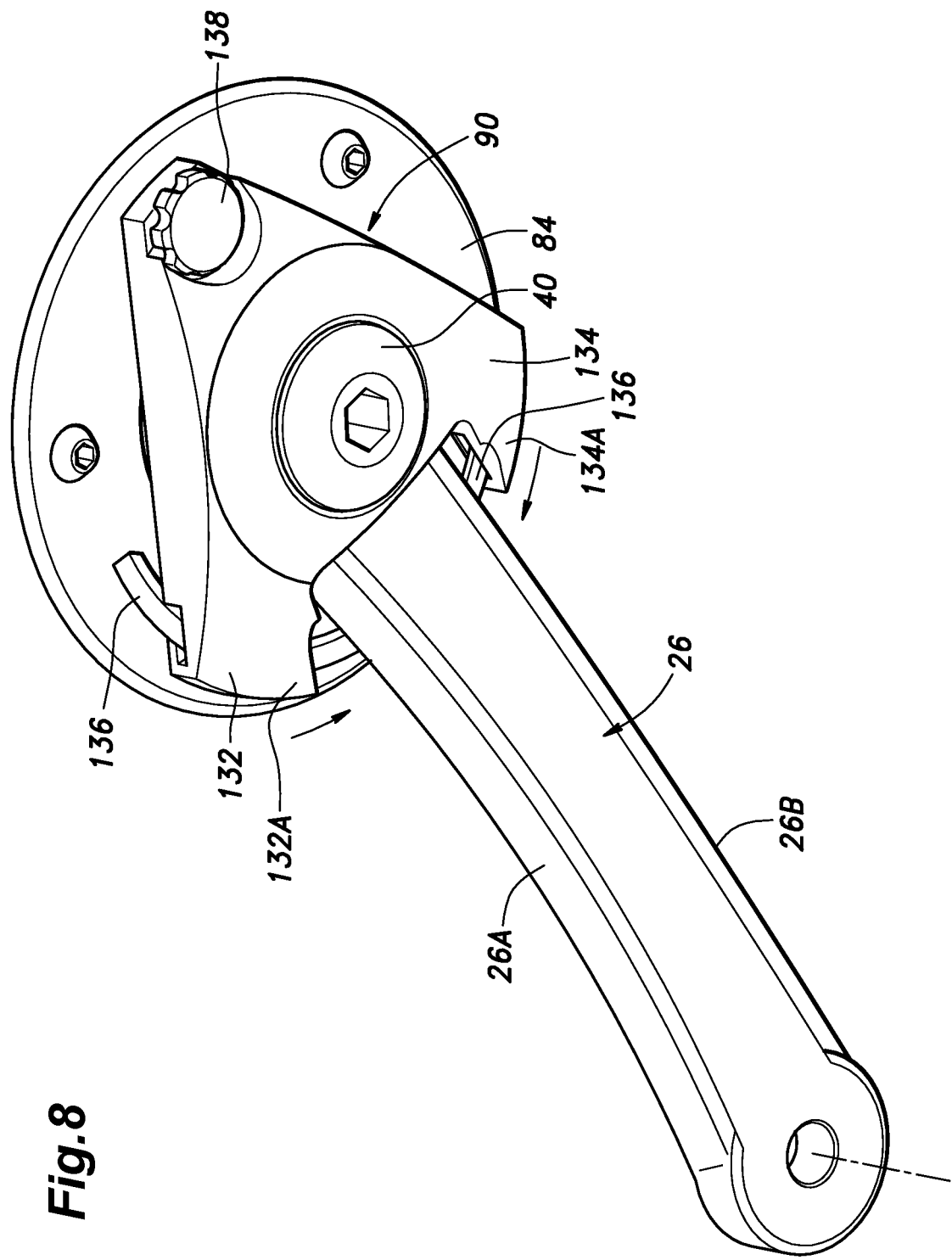
FIG. 8 is a perspective view of an essential part of a retrofit electric machine for a bicycle according to a fourth embodiment of the present invention.

An electric power assisted device for a bicycle according to a fourth embodiment of the present invention is described in the following with reference to FIG. 8. In FIG. 8, parts corresponding to those in FIGS. 1 to 4 are denoted with the same reference numerals as those in FIGS. 1 to 4 without repeating the description of such parts.

The fourth embodiment is provided with a torque transmitting member that includes a pair of rotatable members 132 and 134 that are mounted so as to be rotatable around the rotational center line of the crankarm 26. The rotatable members 132 and 134 are provided with free ends 132A and 134B, respectively, that are located on the respective sides of the crankarm 26 in the rotational direction, and are configured to contact the outer surfaces 26A and 26B of the crankarm 26 from either rotational direction.

The rotating plate 84 is provided with an arcuate guide member 136 concentric to the center of the rotating plate 84. The free ends 132A and 134B of the rotatable members 132 and 134 are slidably engaged with the guide member 136.

The rotatable members 132 having the free end 132A configured to abut against the outer surface 26A of the crankarm 26 on the rotationally trailing side or the side to which the assist force is applied is connected to the rotating plate 84 via a torque transmitting bolt 138. The through hole (not shown in the drawings) formed in the rotatable member 132 for passing the torque transmitting bolt 138 therethrough consists of an arcuate slot concentric to the rotating plate 84.

The rotatable members 132 and 134 are fixed at desired angular positions to the crankarm 26 by a crankarm fixing screw 40 which serves as a connecting member provided in the rotationally central part of the crankarm 26 and threaded into the screw hole 38 (see FIG. 2) of the crankshaft 24.

In the fourth embodiment, the assist force is transmitted from the rotating plate 84 to the crankarm 26 via the torque transmitting bolt 138 and the rotatable member 132.

In the fourth embodiment, the rotatable members 132 and 134 can be fixed to the crankarm 26 at any desired angular positions around the rotational center line of the crankarm 26 while maintaining the concentricity of the rotating plate 84 with the crankarm 26. Thus, the electric power assist device 50 can be adapted to a wide range of crankarms 26 having different dimensions and configurations.

Further, since the crankarm 26 is clamped between the free ends 132A and 134B of the rotatable members 132 and 134 from either rotational direction, relative rotational displacement (rotational play) between the rotating plate 84 and the crankarm 26 is prevented during use, and the assist force can be transmitted from the rotating plate 84 to the crankarm 26 in a stable and reliable manner without any fluctuations during use.

Further, since the free ends 132A and 134B of the rotatable members 132 and 134 are slidably engaged with the guide member 136, the angular positions of the rotatable members 132 and 134 are stabilized, and relative rotational displacement between the rotating plate 84 and the crankarm 26 during use can be avoided in an even more reliable manner.

The present invention has been described in terms of specific embodiments, but is not limited by such embodiments, and can be modified in various ways without departing from the scope of the present invention. For instance, the electric power assist device 50 can be mounted on the exterior of the seat tube 12, the down tube 14, the auxiliary tube 15, the chain stay 16, the pipe joint 22, etc., instead of the tubular bearing housing 20.

The electric motor 54 can also be used as a generator that generates electricity by pedaling the bicycle 10.

The various elements of the present invention described in conjunction with the foregoing embodiments are not entirely essential for the present invention, and can be omitted or substituted without departing from the scope of the present invention.

| GLOSSARY OF TERMS | |
|---|---|
| 10: bicycle | 12: seat tube |
| 14: down tube | 15: auxiliary tube |
| 16: chain stay | 18: frame |
| 20: tubular bearing housing | 22: pipe joint |
| 24: crankshaft | 26: crankarm |
| 26A: outer surface | 26B: outer surface |
| 28: crankarm | 30: pedal |
| 32: drive sprocket | 34: rectangular rod portion |
| 36: rectangular hole | 38: screw hole |
| 40: crankarm fixing screw (connecting member) | |
| 42: circular hole | 44: collar member |
| 50: retrofit electric device for a bicycle (electric power assist device) | |
| 50: electric power assist device | 52: housing |
| 52A: first half | 52B: second half |
| 52C: annular portion | |
| 54: electric motor (rotating electric machine) | |
| 56: outer casing | 58: output shaft |
| 60: drive spur gear | 62: bush |
| 64: intermediate shaft | 66: intermediate spur gear |
| 68: intermediate spur gear | 70: central opening |
| 72: cylindrical portion | 74: outer peripheral portion |
| 76: right side portion | 78: ball bearing |
| 80: output spur gear | 84: rotating plate (rotating member) |
| 90: connecting mechanism | 92: connecting plate (connecting member) |
| 92A: through hole | 92B: central portion |
| 92C: end portion | 94: connecting pin |
| 96: rotatable claw member | 96A: base portion |
| 96B: free end | 96C: engaging groove |
| 98: pivot shaft | 100: binding arm (binding member) |
| 100A: engaging groove | 102: binding ring (binding member) |
| 102A: side | 102B: side |
| 104: torque transmitting main body | 104A: opposing portion |
| 104B: opposing portion | 104C: central portion |
| 106: pivot shaft | 108: bracket |
| 110: clamp member | 112: tilt adjusting screw member |
| 114: mounting screw member | 116: connecting screw member |
| 118: screw | 120: linear guide member |
| 122: torque transmitting main body | 122A: opposing portion |
| 122B: opposing portion | 122C: central portion |
| 122D: side guide piece | 122E: end portion |
| 124: rubber member | 124A: side |
| 124B: side | 126: slot |
| 128: bracket | 130: position adjusting screw |
| 132: rotatable member | 132A: free end |
| 134: rotatable member | 134B: free end |
| 136: guide member | |
| 138: torque transmitting bolt (torque transmitting member) | |
| 150: control unit | 152: battery |

The invention claimed is:

1. A retrofit electric machine for a bicycle, comprising:
a housing configured to be attached to a frame of a bicycle,
a rotating electric machine attached to the housing;
an annular rotating member mounted on the housing in a rotatable manner and connected to the rotating electric machine in a torque transmitting relationship;
a torque transmitting member mounted on the rotating member and including a pair of parts configured to abut against either side of a crankarm for a pedal of the bicycle with respect to a rotational direction thereof; and
a connecting member configured to connect the torque transmitting member with a rotationally central part of the crankarm such that the rotating member is concentric to a rotational center line of the crankarm,
wherein the torque transmitting member includes a pair of rotatable claw members rotatably mounted on the rotating member and having free ends configured to abut against either side of the crankarm with respect to the rotational direction, and a binding member for pulling the rotatable claw members toward each other so that the free ends of the rotatable claw members are pressed against respective outer surfaces of the crankarm from either rotational direction, and
the connecting member is provided with a connecting plate including two ends forming connecting portions with respective base ends of the rotatable claw members and a central portion forming a connecting portion with the rotationally central part of the crankarm.

2. The retrofit electric machine for a bicycle according to claim 1, wherein the housing includes an annular part concentrically supporting the rotating member, and the annular part and the rotating member are configured to be positioned between the frame and the crankarm.

3. The retrofit electric machine for a bicycle according to claim 1, further comprising a transmission gear train provided inside the housing between the rotating electric machine and the rotating member such that the rotating electric machine is offset radially outward relative to the rotating member owing to positioning of the transmission gear train.

4. The retrofit electric machine for a bicycle according to claim 1, wherein the rotating electric machine consists of an electric motor for generating an assist force, and the retrofit electric machine further comprises a battery configured to be mounted on the frame and to serve as a power source for the electric motor.

5. A bicycle fitted with the retrofit electric machine for a bicycle according to claim 1.

6. A retrofit electric machine for a bicycle, comprising:
- a housing configured to be attached to a frame of a bicycle,
- a rotating electric machine attached to the housing;
- an annular rotating member mounted on the housing in a rotatable manner and connected to the rotating electric machine in a torque transmitting relationship;
- a torque transmitting member mounted on the rotating member and including a pair of parts configured to abut against either side of a crankarm for a pedal of the bicycle with respect to a rotational direction thereof; and
- a connecting member configured to connect the torque transmitting member with a rotationally central part of the crankarm such that the rotating member is concentric to a rotational center line of the crankarm, wherein the torque transmitting member includes
- a torque transmitting main body mounted on the rotating member via a bracket so as to be rotatable around an axial line orthogonal to the rotational center line of the crankarm and provided with a pair of opposing portions configured to oppose either outer surface of the crankarm with respect to the rotational direction,
- a clamp member threadably engaged by one of the opposing portions and configured to abut against one of the outer surfaces of the crankarm with respect to the rotational direction, and
- a tilt adjusting screw member threadably engaged by the torque transmitting main body and having a free end abutting against the rotating member, the connecting member being provided with a connecting screw member threadably engaged by the torque transmitting main body and connected to the rotationally central part of the crankarm.

7. A retrofit electric machine for a bicycle, comprising:
- a housing configured to be attached to a frame of a bicycle,
- a rotating electric machine attached to the housing;
- an annular rotating member mounted on the housing in a rotatable manner and connected to the rotating electric machine in a torque transmitting relationship;
- a torque transmitting member mounted on the rotating member and including a pair of parts configured to abut against either side of a crankarm for a pedal of the bicycle with respect to a rotational direction thereof; and
- a connecting member configured to connect the torque transmitting member with a rotationally central part of the crankarm such that the rotating member is concentric to a rotational center line of the crankarm, wherein the torque transmitting member includes
- a linear guide member fixed to the rotating member and extending in a tangential direction of the rotating member,
- a torque transmitting main body mounted on the rotating member via the linear guide member so as to be moveable in the tangential direction of the rotating member, and provided with a pair of opposing portions opposing either rotational side of the crankarm, the connecting member being provided with a fixing screw configured to secure the torque transmitting main body to the crankarm.

8. The retrofit electric machine for a bicycle according to claim 7, further comprising a rubber member to be interposed between the torque transmitting main body and the crankarm.

* * * * *